US012731442B2

(12) United States Patent
Higgins

(10) Patent No.: US 12,731,442 B2
(45) Date of Patent: Sep. 8, 2026

(54) PLATFORM FOR VEHICLE BASED TOLLING AND TELEMATICS

(71) Applicant: CHROMA TRANSIT TECH LLC, Covina, CA (US)

(72) Inventor: Christopher T. Higgins, Covina, CA (US)

(73) Assignee: CHROMA TRANSIT TECH LLC, Covina, CA (US)

( * ) Notice: Subject to any disclaimer, the term of this patent is extended or adjusted under 35 U.S.C. 154(b) by 0 days.

(21) Appl. No.: 18/989,105

(22) Filed: Dec. 20, 2024

(65) Prior Publication Data

US 2025/0209858 A1 Jun. 26, 2025

Related U.S. Application Data

(60) Provisional application No. 63/616,517, filed on Dec. 30, 2023, provisional application No. 63/615,275, filed on Dec. 27, 2023, provisional application No. 63/614,906, filed on Dec. 26, 2023.

(51) Int. Cl.
*G07B 15/06* (2011.01)
*G06Q 50/40* (2024.01)

(52) U.S. Cl.
CPC ........... *G07B 15/063* (2013.01); *G06Q 50/40* (2024.01); *G06Q 2240/00* (2013.01)

(58) Field of Classification Search
CPC ... G07B 15/063; G06Q 50/40; G06Q 2240/00
See application file for complete search history.

(56) References Cited

U.S. PATENT DOCUMENTS 7,016,311 B2 * 3/2006 Tiernay .................. G08G 1/017 370/347
9,922,473 B1 * 3/2018 Haworth ............. H04W 12/068
2005/0168351 A1 * 8/2005 Saze .................... G07B 15/063 705/13
2006/0106671 A1 * 5/2006 Biet ..................... G07B 15/063 705/13
2013/0110685 A1 * 5/2013 Dempski ................ G06Q 50/40 705/30
2015/0134428 A1 * 5/2015 Li ....................... G06Q 20/326 705/13

(Continued)

FOREIGN PATENT DOCUMENTS

CN 101243514 A * 8/2008 ............... H03L 7/07
WO WO-9965681 A1 * 12/1999 ............ B60T 8/4863

(Continued)

OTHER PUBLICATIONS

"Nationwide Electronic Toll Collection Interoperability", published by U.S. Department of Transportation in Mar. 2021 (Year: 2021).*

(Continued)

*Primary Examiner* — Omar Zeroual
(74) *Attorney, Agent, or Firm* — Lando & Anastasi, LLP

(57) ABSTRACT

A vehicle device capable of emulating one or more tolling systems is presented, the vehicle device configured to determine a first type of tolling system in use on a first toll route, emulate the first type of tolling system, determine a second type of tolling system in use on a second toll route, and emulate the second type of tolling system.

20 Claims, 5 Drawing Sheets

(56) References Cited

U.S. PATENT DOCUMENTS

| | | | | |
|---|---|---|---|---|
| 2015/0199664 | A1 | 7/2015 | Buckman et al. | |
| 2015/0228125 | A1 | 8/2015 | Silva et al. | |
| 2016/0171787 | A1* | 6/2016 | Yohalashet | G07B 15/063 705/13 |
| 2017/0364719 | A1* | 12/2017 | Boehm | G06K 7/10366 |
| 2018/0197348 | A1* | 7/2018 | Geist | G07B 15/063 |

FOREIGN PATENT DOCUMENTS

| | | | | |
|---|---|---|---|---|
| WO | WO-2014085617 | A1 * | 6/2014 | G08G 1/017 |
| WO | 2016/055226 | A1 | 4/2016 | |
| WO | WO-2016164924 | A2 * | 10/2016 | G07B 15/063 |

OTHER PUBLICATIONS

International Search Report for PCT Application No. PCT/US2024/061233, mailed Mar. 3, 2025.

* cited by examiner

PLATFORM FOR VEHICLE BASED TOLLING AND TELEMATICS

CROSS-REFERENCE TO RELATED APPLICATIONS

This application claims priority under 35 U.S.C. § 119(e) to U.S. Provisional Application Ser. No. 63/614,906, titled "Device and Method for HOV Election in Tolling," filed on Dec. 26, 2023, and hereby incorporated by reference in its entirety for all purposes; and to U.S. Provisional Application Ser. No. 63/615,275, titled "Device and Method for Providing a Smart Toll Transponder," filed on Dec. 27, 2023, hereby incorporated by reference in its entirety for all purposes, and to U.S. Provisional Application Ser. No. 63/615,517, titled "System, Device, and Method for Providing a Vehicle-based Platform to Support Toll Transponders, Telematics, MBUF/RUF Capabilities, and HOV Election," file on Dec. 30, 2023, and hereby incorporated by reference in its entirety for all purposes.

BACKGROUND

1. Field of the Disclosure

At least one example in accordance with the present disclosure relates generally to systems for tolling road vehicles.

2. Discussion of Related Art

Modern tolling systems use license plate capture and/or transponders to identify vehicles on the road and to issue tolls to the owners of those vehicles.

SUMMARY

According to at least one aspect of the present disclosure, a vehicle device for emulating a tolling system is presented, comprising determine a first type of tolling system in use on a first toll route, emulate the first type of tolling system, determine a second type of tolling system in use on a second toll route, and emulate the second type of tolling system.

In some examples, the vehicle device further comprises a transceiver, the transceiver being configurable to operate as one or both of a passive transponder and an active transponder. In some examples, the vehicle device further comprises a display, the display being configured to provide an indication of a change in a tolling level election. In some examples, the vehicle device further comprises a display and a user interface, the display being configured to provide an indication to select a tolling level election and the user interface configured to receive an election of a tolling level. In some examples, the vehicle device is further configured to determine the first type of tolling system by acquiring location data and determining whether the vehicle is on a toll route based on the location data. In some examples, the vehicle device is further configured to determine a number of miles traveled by the vehicle and to transmit a signal that enables payment of a toll based on the number of miles. In some examples, the vehicle device is further configured to facilitate payment of at least one of a first toll corresponding to the first toll route or a second toll corresponding to the second toll route. In some examples, the vehicle device is further configured to use at least one antenna to communicate using a first network connection, the first network connection communicatively linking the vehicle device to at least one of an intermediary collection service or a tolling agency. In some examples, the vehicle device further includes at least one display, and one or more input/output ports.

According to at least one aspect of the present disclosure, a method of managing toll payment is presented, comprising: determining a first type of tolling system associated with a first toll route; emulating the first type of tolling system; determining a second type of tolling system associated with a second toll route; and emulating the second type of tolling system.

In some examples, the method further comprises configuring a transceiver to operate as an active transponder responsive to determining that the first type of tolling system uses active transponders, or configuring the transceiver to operate as a passive transponder responsive to determining that the second type of tolling system uses passive transponders. In some examples, the method further comprises displaying an indication of a change in a tolling level election. In some examples, the method further comprises providing an indication to select a tolling level election and, responsive to receiving an input, electing a corresponding tolling level. In some examples, determining the first type of tolling system includes acquiring location data and determining the first toll route based on the location data, the location data corresponding to a location of a vehicle on the first toll route. In some examples, the method further comprises acquiring a number of miles traveled by a vehicle on the first toll route and transmitting a signal to facilitate payment of a toll based on the number of miles. In some examples, the method further comprises transmitting a signal to facilitate payment of at least one of a first toll corresponding to the first toll route or a second toll corresponding to the second toll route. In some examples, the method further comprises communication using a first network connection to transmit a signal to facilitate payment of a toll, the first network connection communicatively linking to at least one of an intermediary collection service or a tolling agency.

According to at least one aspect of the present disclosure, a non-transitory computer-readable medium is presented, containing thereon instructions for paying a toll, the instructions instructing at least one processor to determine a first type of tolling system associated with a first toll route; emulate the first type of tolling system; determine a second type of tolling system associated with a second toll route; emulate the second type of tolling system.

In some examples, the instructions further instruct the at least one processor to configure a transceiver to operate as an active transponder responsive to determining that the first type of tolling system uses active transponders, and to configure the transceiver to operate as a passive transponder responsive to determining that the first type of tolling system uses passive transponders. In some examples, the instructions further instruct the at least one processor to elect a tolling level for use in determining a toll on a toll route.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Aspects of the present disclose relate to devices that provide wide-ranging functionality for road vehicles, road users, and other types of vehicles and the users of those vehicles. For the sake of simplicity, the terms "vehicle" and "road vehicle," "user" and "road user" will be used herein, but, as stated above, any type of vehicle or vehicle user may be substituted instead.

At present, a wide array of products exist related to tolling, telematics, HOV election, road user charging (RUC), and so forth. However, these devices are inefficient and unwieldy. Among other things, the existing devices are discrete devices that occupy substantial space and draw substantial power from the vehicle. Furthermore, these devices, tolling devices in particular, work on only a single network, and do not transfer from network-to-network. As a result, a tolling device that works in one part of the world that uses a first standard or system may not or simply will not work in another part of the world that uses a second, different standard or system. Because toll systems are not standardized, vehicles traveling along various toll routes that use different systems may need to carry additional hardware, for example, multiple toll transponders of different types, simply to pay each of the applicable tolls. These multiple devices can be expensive, difficult to organize, can consume valuable space and vehicle power, and may be generally inefficient.

According to aspects of the present disclosure, a single communication device is provided that combines the functionalities described above and that has intelligent functionality allowing the device to change from one standard to another, thereby permitting the device to be used throughout the world. The device is therefore more efficient in terms of power and space usage than the multitude of existing devices required to obtain the same functionality, and provides conveniences not available in the state-of-the-art by permitting the user and/or vehicle to have a single device that works anywhere in the world and/or in a given geographic region (e.g., North America, the United States, Europe, China, etc).

Figure 1:
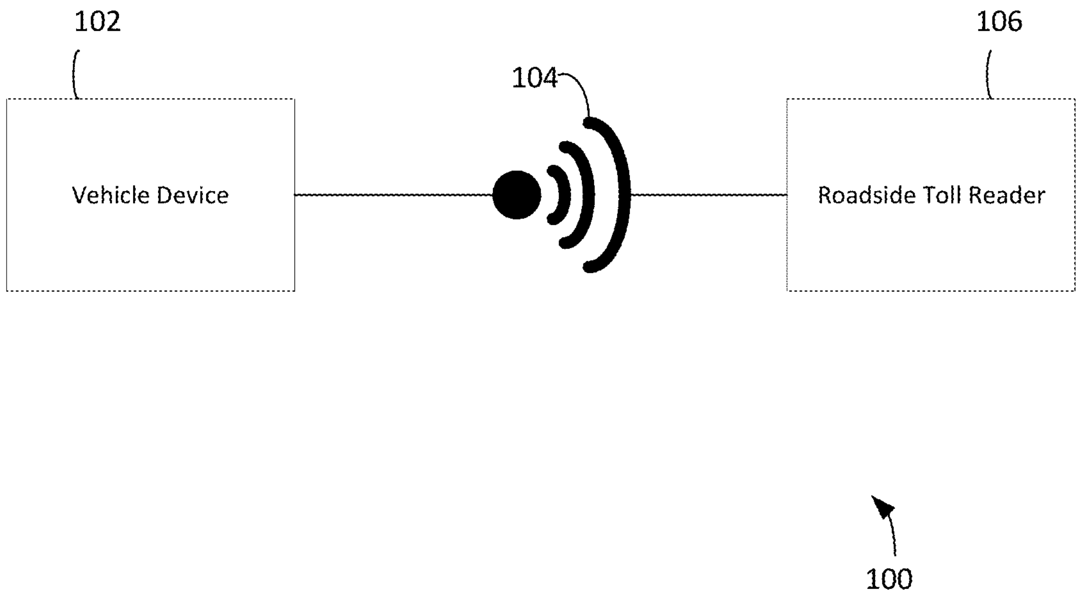
FIG. 1 illustrates a network according to an example.

FIG. 1 illustrates a high-level block diagram of a communication network 100. The communication network 100 is capable of identifying signals corresponding to and containing tolling data and then issuing the toll. Additionally, the communication network 100 may be capable of collecting the toll, identifying the vehicle corresponding to the signal, and so forth.

The communication network 100 includes a vehicle device 100, a network connection 104, and a roadside toll reader 106.

The vehicle device 102 and the roadside toll reader 106 may communicate via the network connection 104. The network connection 104 may be any type of communication connection, including passive or active transponders, WiFi, internet, radio, telephonic, and so forth, including, but not limited to Bluetooth, WiFi, cellular, LoRa, WAN, NFC, toll reader, and vehicle-to-infrastructure wireless systems.

The roadside toll reader 106 may be of many different types. For example, the roadside toll reader 106 may be an active device, whereby it "pings" passing vehicles and receives a response. Alternatively, the roadside toll reader 106 may be a passive device, whereby the roadside toll reader 106 receives data from an active transponder on a passing vehicle. These options encompass both active transponder protocols and passive transponder protocols (e.g., the protocols the transponders use to communicate). In some examples, the roadside toll reader 106 may also distinguish between vehicles subject to one tolling level and those subject to a different tolling level. For example, vehicles may receive a discount on the charged toll if they are high occupancy vehicles ("HOV") and are carrying multiple passengers (e.g., two, three, four people, and so forth), which may qualify the vehicle for a lower tolling level. Likewise, a large vehicle, for example vehicles with a large number of axles, such as a semi-truck, may also be subject to a higher tolling level relative to that of ordinary vehicles.

Note that, while the term roadside toll reader is used here, other types of toll reader are also encompassed by this disclosure, as well as devices with similar functionality, for example, tolling for the use of a canal lock, parking meter enforcement/collections, customs collections, and so forth.

Figure 4:
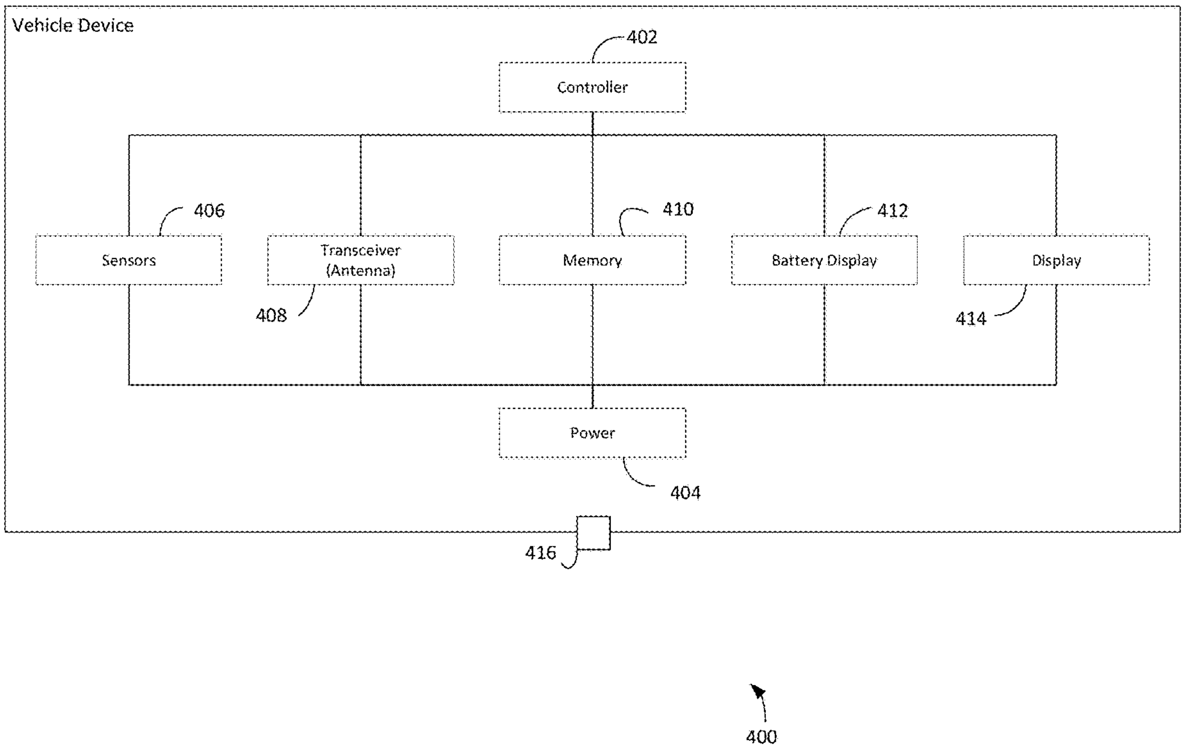
FIG. 4 illustrates a vehicle device according to an example.

The vehicle device 102 may be a vehicle device as described with respect to FIG. 4, herein. The vehicle device 102 may be used to pay tolls. The vehicle device 102 may be a physical device located within and/or on a vehicle. For examples, the vehicle device 102 may be located on the dashboard, on a bumper, integrated into a license plate, mounted on a windshield, used in place or a hood ornament, and so forth.

The vehicle device 102 may also have connections and/or adapters for interfacing with various types of vehicle connection. For example, the vehicle device 102 may be able to interface with vehicle cigarette adapters, USB ports, OBD-II ports, and so on.

The vehicle device 102 may be able to operate as both an active and passive transponder, may be able to detect the transponder mode to operate in (e.g., may be able to emulate any transponder type or protocol), may support election of different tolling levels (e.g., may support HOV election), and may have other functions, as described herein. The vehicle device 102 may therefore act as a transponder of either active or passive types for the purpose of tolling and responding and/or reacting to the roadside toll reader 102.

In some examples, the vehicle device 102 may be programmed with user information. For example, the vehicle device 102 may be programmed with the user's identity, the identity of the vehicle (for example, VIN or license plate numbers), and/or user account credentials and information associated with various accounts managed by tolling agencies. For example, the vehicle device 102 may have tolling account information for a user account associated with a first tolling agency, a second tolling agency, and so forth. The vehicle device 102 may use the account information for various purposes, such as paying tolls issued by different tolling agencies.

Figure 2:
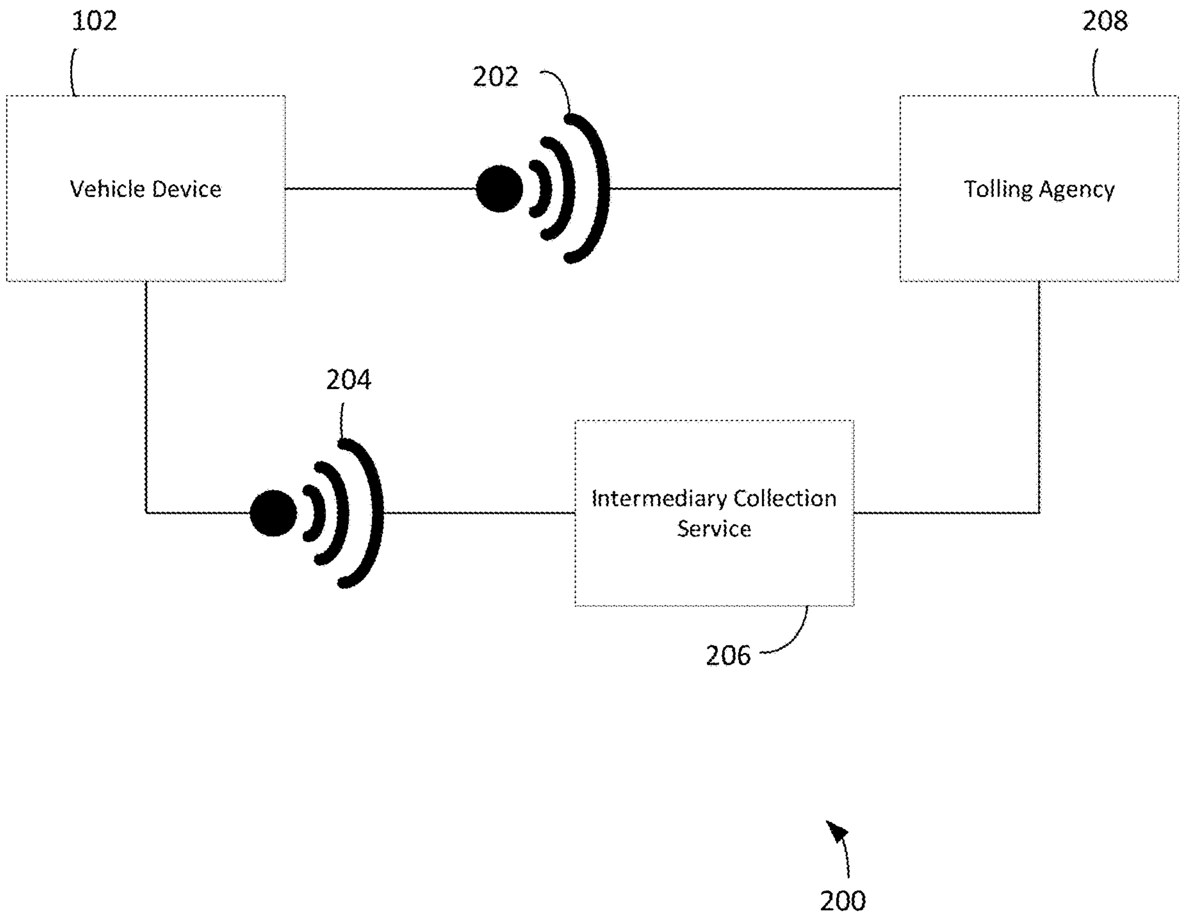
FIG. 2 illustrates a network according to an example.

FIG. 2 illustrates a high-level block diagram of a communication network 200 according to an example. The communication network 200 may be used for the collection of tolls.

The communication network 200 includes the vehicle device 102 of FIG. 1 (or an equivalent device, as described herein), a first network connection 202, a second network connection 204, an intermediary collection service ("ICS") 206, and a tolling agency 208.

The vehicle device 102 may be a vehicle device as described herein. The vehicle device 102 may be configured to communicate via the first network connection 202 and the second network connection 204. The first network connection 202 may link the vehicle device 102 to the tolling agency 208, while the second network connection 204 may link the vehicle device 102 to the ICS 206. These network connections may be of any type.

When a vehicle containing the vehicle device 102 would be tolled (e.g., is on a toll route, such as a toll road), the vehicle device 102 may communicate via the first network connection 202 with the tolling agency 208 to pay the toll. The tolling agency 208 is the agency, business, system, and/or entity empowered to collect the toll on the toll route. Thus the vehicle device 102 may pay the toll directly to the tolling agency 208.

Likewise, when the vehicle containing the vehicle device 102 would be tolled, the vehicle device 102 may communicate via the second network connection 204 with the ICS 206 to pay the toll. The ICS 206 is an agency, business, system, and/or entity that can facilitate collection of the toll for the tolling agency 208 via various methods. For example, if the vehicle device 102 does not have a direct connection to the tolling agency 208 (e.g., because the tolling agency 208 does not allow direct payment of tolls or lacks the infrastructure to directly collect a toll, or because the vehicle device 102 is not compatible with the tolling agency's 208 protocol or not programmed to directly connect to the tolling agency 208, and so forth), the ICS 206 acts as a middle man, carrying out any necessary functions related to ensuring the toll is connected. For example, the ICS 206 may receive a transmission from the vehicle device 102, the transmission encoded using a first protocol that is not supported by the tolling agency 208, and then may convert the transmission into a protocol that is supported by the tolling agency 208 and forward the transmission to the tolling agency 208 for collection of the toll. Thus, the ICS 206 can act as a sort of relay facilitating communication between the vehicle device 102 and the tolling agency 208.

In both cases, the vehicle device 102 may elect various tolling levels (e.g., HOV election), and receive the elected tolling rate, as both the tolling agency 208 and the ICS 206 may be capable of understanding when a vehicle has elected a given tolling level.

Figure 3:
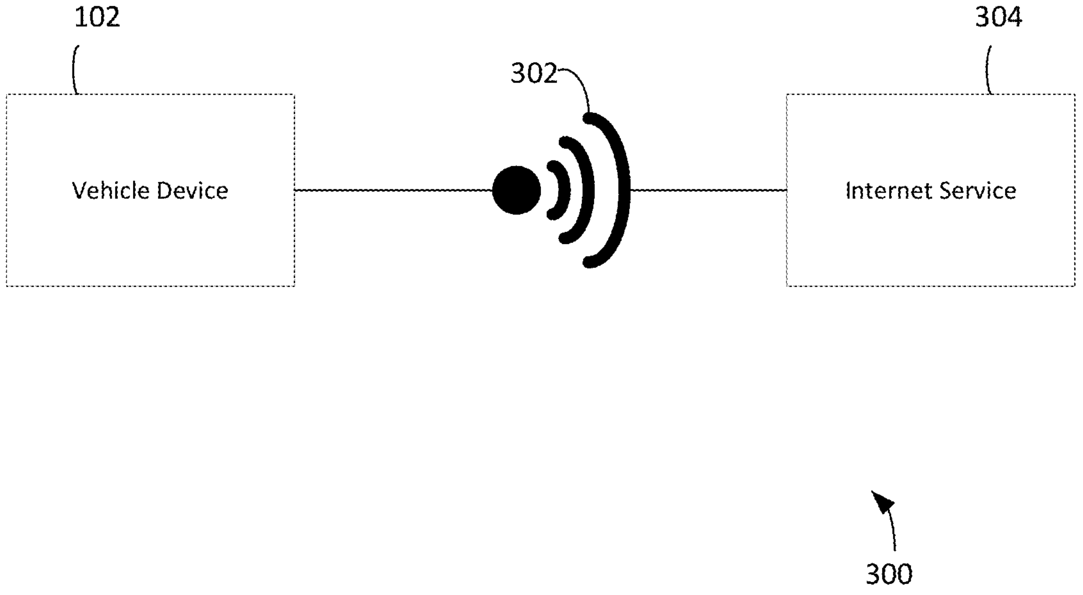
FIG. 3 illustrates a network according to an example.

FIG. 3 illustrates a high level block diagram of a communication network 300 according to an example. FIG. 3 is similar to FIGS. 1 and 2 except that communications and tolling is facilitated via an internet service 306 which may or may not be an ICS 206 or other intermediary.

The communication network 300 includes the vehicle device 102 (or equivalent, as discussed herein), a network connection 302, and an internet service 304. The network connection 302 facilitates communication between the vehicle device 102 and the internet service 304.

The internet service 304 may be a service for collecting vehicle tolls on a toll route. For example, the internet service 304 may be an application that collects tolls on behalf of a tolling agency or intermediary (such as tolling agency 208 and/or ICS 206, respectively, of FIG. 2). Thus, the vehicle device 102 may also use internet connections, or similar connections, to facilitate collection of the toll.

With respect to FIGS. 1, 2, and 3 if additional information needs to be collected (such as information for verifying that a vehicle is occupied by the requisite number of people to qualify for an HOV election), the vehicle device 102 may collect such information and forward it via the roadside tolling device 106 or the ICS 206, send such information directly to the tolling agency 208, or send and/or forward such information via the internet, including via an internet application or relay. In general, the vehicle device 102 may collect any vehicle telematics, including general telematics, mileage based user fees (MBUF), road user charging (RUC), indirect HOV election, vehicle location and/or speed, the time and/or date, driver information, vehicle identification information, braking forces, collision detection/impact force, miles drive, fuel usage, timeframes spent driving, acceleration, deceleration, steering angles, speeds, and rates, speed limit infractions, proximity to other vehicles, and so forth. The vehicle device 102 may even generate a driving report card based on the telematics.

FIG. 4 illustrates a high-level block diagram of a vehicle device 400 according to an example. The vehicle device 400 may be one embodiment of the vehicle device 102 of FIGS. 1, 2, and 3. The vehicle device 400 is capable of paying or facilitating the payment of tolls, collecting vehicle telematics data, determining tolling level elections, and so forth.

The vehicle device 400 includes multiple components, including a controller 402, a power source 404, one or more sensors 406 ("sensors"), a transceiver 408, memory 410, a battery display 412, a display 414, and one or more input/output ("IO") ports 416.

The controller 402 may be coupled to the sensors 406, transceiver 408, memory 410, battery display 412, display 414, and/or power source 404. The power source 404 may be further coupled to the sensors 406, the transceiver 408, the memory 410, the battery display 412, and/or the display 414. The IO portions 416 may be coupled to any of the controller 402, power source 404, sensors 406, transceiver 408, memory 410, battery display 412, and/or display 414.

The controller 402 controls the vehicle device 400 and/or the components of the vehicle device 400. The controller 402 may be a monolithic element or a collection (e.g., group) of elements, and may include processors, specialized circuits (ASICs, FPGAs, and so forth), microcontrollers, and so forth.

The power source 404 is a power source, such as a battery, transformer, power port, and so forth, which provides power to the vehicle device 400 and powers the components of the vehicle device 400. The power source 404 may be configured to be coupled to an external power source, such as a plug or other power port located in a vehicle. The power source 404 may include recharging elements, such as solar panels, as well.

The sensors 406 may include any type of sensor, including cameras, temperature sensors, weight sensors, object sensors, location sensors (such as global positioning ("GPS") systems), distance sensors (such as sensors tracking rotations of vehicle wheels or monitoring the distance traveled using the location sensors), as well as sensors that interface with the vehicle, such as sensors configured to read the odometer or to capture odometer readings, and so forth. The sensors 406 may be located on the inside or outside of the vehicle, and may be peripherals to the vehicle device 400 rather than integrated components.

Note that, in some examples, the sensors 406 may be sensors of the vehicle rather than of the vehicle device 400.

For example, when connected to the vehicle, the vehicle device 400 may be able to access and use the sensors of the vehicle.

The transceiver 408 may be any type of communication system, including but not limited to any type of radio (e.g., any device using the electromagnetic spectrum, including the radio spectrum, to send or receive signals) or physical connection. The transceiver 408 may include transponders (active and/or passive) as well as antennas and/or other communication equipment. The controller 402 may be able to control the transceiver 408 to manage the communications and modes of the transceiver. For example, the controller 402 may be able to activate or deactivate passive and active transponder modes of the transceiver 408, internet connectivity, telephone network connectivity, radio operation, and so forth. The controller 402 may also receive incoming signals from the transceiver 408 and may determine outgoing signals sent by the transceiver 408.

The memory 410 may be any type of combination of volatile and/or nonvolatile memory, for example, flash memory, random access memory, read only memory, disk storage, and so forth. The memory 410 may store incoming and outgoing signals (e.g., in digital form), and may store software programs. The controller 402 may be configured to access the memory 410 and manage the memory 410.

The battery display 412 may display the status of the power source 404, including whether the power source 404 is connected to an external source of power, the state of charge of the power source 404, and any other relevant information about the power source 404 (e.g., temperature, fault conditions, warnings about low power, and so forth).

The display 414 may be a user facing display (where the user may be any entity capable of interfacing with the vehicle device 400, including a driver or operator of the vehicle). The display 414 may display information about the vehicle device 402 to the user. For example, the display 414 may display the operating mode of the transceiver, the current geographic location of the vehicle, speed of the vehicle, applicable toll rates on the current route the vehicle is traveling, whether alternative toll rates have been elected, and if so, which alternative toll rates, the relevant tolling agency and/or ICS of the toll route, and so forth. Additionally, the display 414 may include an input interface, for example, a touchscreen, voice recognition system, or keyboard, with which the user may input instructions to the vehicle device 400. For example, if the user wishes to make a toll level election (for example, HOV election) manually, the display 414 may permit the user to make such inputs. The display 414 may include one or more screens (e-Ink, LCD, LED, and so on), and/or other forms of providing feedback to the user, including individual lights indicating the status of given functions, auditory feedback (for example, beeps, voice messages, and so forth), and so on.

The IO ports 416 may include any physical or wireless connections. For example, USB ports for connecting to a vehicle or external computer, a charging port for connecting a charger, an ethernet port, OBD-II ports, and so forth. The IO ports 416 may permit external devices, such as external computers, to reprogram or alter settings of the vehicle device 400 by providing a means by which said external devices may interface with the vehicle device 400.

In some examples, the vehicle device 400 may be programmed (e.g., software installed) prior to possession by the user. For example, the vehicle device 400 may be programmed at the place of manufacture. In some examples, the vehicle device 400 may be reprogrammable.

In some examples, the vehicle device 400 may be housed in a shell or shroud (for example, a plastic shroud), or may be integrated into another device (for example, a cell phone, the bumper, the dashboard, and so on).

As will be discussed below, the vehicle device 400 may perform various operations. With respect to the embodiment of FIG. 4, the controller 402 may be tasked with managing and/or carrying out these operations. Accordingly, the following discussion will reference the controller 402, but the following discussion is not limited to the controller 402.

Upon installation in a vehicle, the vehicle device 400 may begin operation. The controller 402 may prompt the user for various inputs (e.g., date/time, license plate number, driver and/or owner identity, default preferences for election tolling levels, permission to use certain functions, like location data, billing information, tolling agency account information, and so forth). The controller 402 may also automatically retrieve information from the vehicle and/or the onboard systems integrated into the vehicle (e.g., GPS systems, any onboard computer systems or memory, and so forth), or from other sources (such as tolling agencies themselves, external databases that have already aggregated the relevant data, and so on).

During vehicle operation and/or movement, as well as at other times, the controller 402 may detect whether the vehicle is on a toll route, the type of tolling system used on the route, whether a tolling level election is required, the identity of the tolling agency, the protocols used by the tolling system along the route, and so forth. The controller 402 may perform these functions autonomously or manually (e.g., after receiving or requesting a prompt from the vehicle operator).

Detecting whether the route is a toll route, the type of tolling system (active, passive, internet, license plate capture, and so forth) used on the route, the protocols used by the tolling system, and so forth, may be accomplished in various ways. In some examples, the controller 402 may use the sensors 406, the transceiver 408, and/or integrated vehicle systems (such as GPS) to detect and determine said information. For example, the controller 402 may access GPS information to determine where the vehicle is and whether the location is on a tolling route. As another example, the controller 402 may access cameras (its own, peripheral cameras, or vehicle cameras) to capture images of the toll route and infer, from the images, whether the route is a toll route (e.g., by detecting "toll ahead" signs on the road, or location identifiers, such as geographic features or signs, that allow an inference as to the location to be made). Because a location may be associated with a tolling agency, and the tolling agency's systems may be known, the controller 402 can, from knowing the location of the vehicle, determine the appropriate agency, tolling system, and related protocols. Of course, the controller 402 may also seek manual confirmation or input of said data, for example, by requesting or receiving a prompt from the vehicle operator (e.g., the vehicle operator inputs the location, tolling agency, and so forth).

Upon detecting or receiving instructions as to the appropriate mode of operation (e.g., what kind of tolling system to emulate, what protocols to use, and so forth), the controller 402 may then configure the vehicle device 400 to operate using the appropriate modes. For example, the controller 402 may cause the transceiver 408 to operate as an active transponder, or as a passive transponder, or in another mode (e.g., WAN, LoRa, etc).

When requesting or receiving prompts, the controller 402 may also provide feedback (e.g., visual or auditory feedback via the display 414) to the user. Likewise, a given tolling status election can be indicated in similar manner (e.g., by lights on the display 414 that correspond to different elections, or by sounds, or by other visual or auditory feedback). Similarly, the controller 402 may warn or provide indications of when a given tolling level election is ending, when the vehicle is exiting or entering a toll route, and so forth.

As mentioned above, sometimes a tolling agency may require proof of a tolling level election, or may require other information. The controller 402 may collect such information using the sensor 406, onboard systems, and/or by requesting or receiving prompts from the user. For example, the controller 402 could use cameras, weight sensors, object sensors, and so forth, to determine a number of occupants of the vehicle and to relay said information to the tolling agency to prove entitlement to a tolling level election. For example, the controller 402 may detect how many axles the vehicle has, the gross and/or net weight of the vehicle, or may be programmed with said information, and so forth.

In some cases, tolling systems may collect tolls in relatively new ways, such as based on MBUF or other forms of road usage and/or mileage based tolling. Because the controller 402 may determine vehicle telematics (e.g., via the sensors 406 or through the vehicle's onboard systems), the controller 402 may also collect the appropriate data (e.g., miles driven on a toll route) to determine a toll and pay the toll, as well as to provide proof or support for the payment. In some cases, such tolling systems may use the internet to collect the tolls, though it is also possible to use such systems with roadside toll readers or other traditional devices.

Any and all of the above data, as well as other identifying information needed to pay tolls (e.g., the license plate number, VIN, vehicle owner or driver, and so forth), may then be transmitted (e.g., via the transceiver 408). The transceiver 408 may transmit according to any available method, including any of the methods described with respect to FIGS. 1-3.

Figure 5:
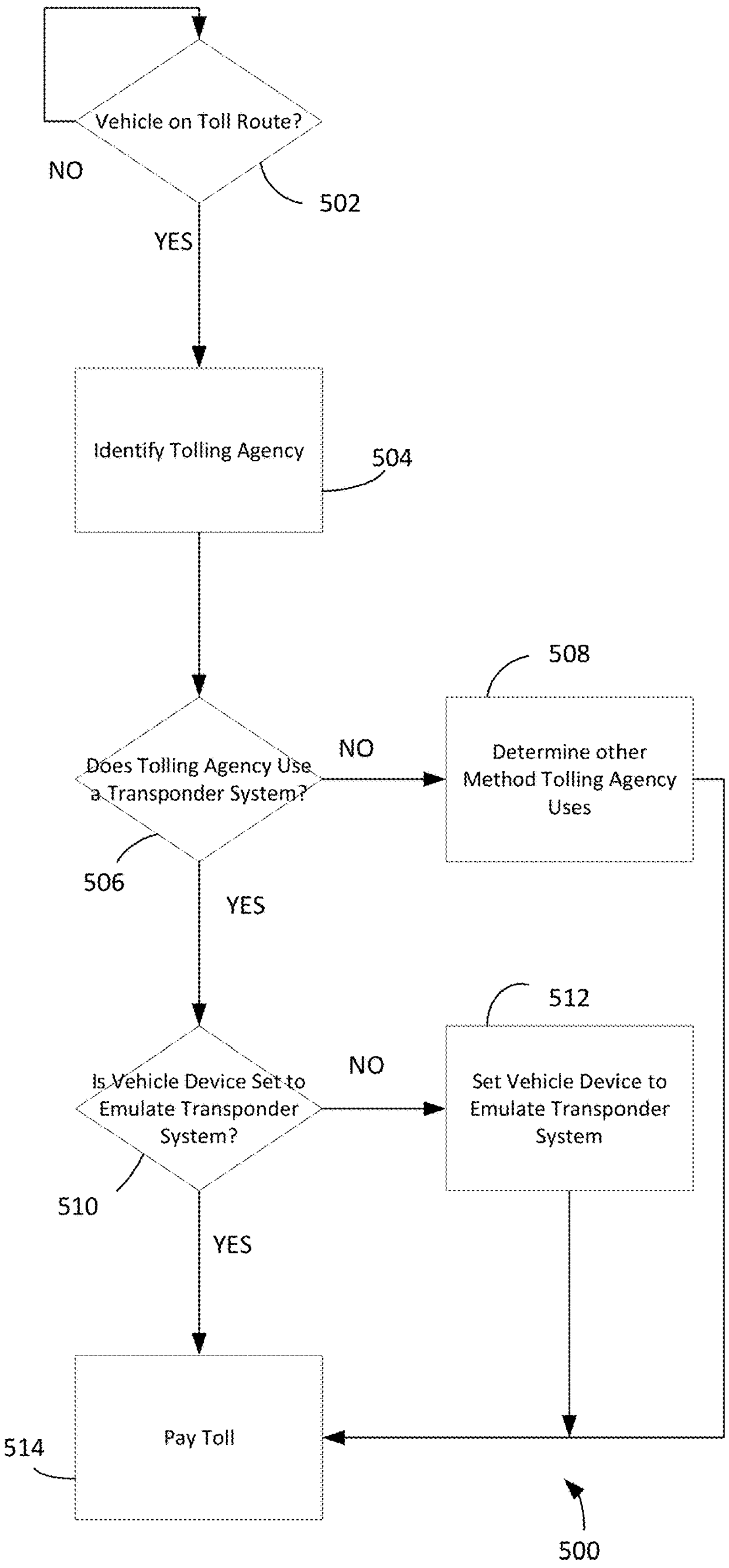
FIG. 5 illustrates a process for emulating a tolling system according to an example.

FIG. 5 illustrates a process 500 for emulating transponders of different types and using different protocols that a vehicle device, such as vehicle devices 102 or 400 of FIGS. 1, 2, 3 and 4, can execute according to an example.

At act 502, the vehicle device determines whether the vehicle is on a toll route. The vehicle device may use any method to determine that the vehicle is on a toll route, including analyzing GPS or other location data, analyzing images or video of the route to identify indications that the route is a toll route (e.g., "toll ahead" signs on a road), and so forth. If the vehicle device determines that the vehicle is not on a toll route (502 NO), the process 500 may remain at act 502 and continue to monitor the status of the route. If the vehicle is on a toll route (502 YES), the process 500 may continue to act 504.

At act 504, the vehicle device may identify the tolling agency tasked with collecting and/or implementing the tolls on the route. The vehicle device may use any method to determine the identity of the tolling agency. For example, the vehicle device may use GPS and/or other location data to determine where the route is located and then reference the location against a database of known tolling agencies to find the tolling agency associated with the location. In some examples, the vehicle device may analyze pictures or video of the toll route to determine the identity of the tolling agency (for example, via signs on the route indicating who collects the toll or what system is used to collect the toll). The process 500 may then continue to act 506. At act 506, the vehicle device determines what type of system the tolling agency uses to collect the toll. For example, the vehicle device may determine whether the tolling agency uses a roadside transponder, an internet-based application, an ICS, or any other type of collection method or implementation. In some examples, the collection method used by a tolling agency may be known and stored in a database that the vehicle device may reference. For example, if an agency is known to use a roadside transponder using a specific protocol, said information may be stored in a database that the vehicle device may reference. If the vehicle device determines that the tolling agency uses a transponder system (506 YES), the process 500 may continue to act 510. If the vehicle device determines that the tolling agency does not use a transponder system (506 NO), the process 500 may continue to act 508.

At act 508, the vehicle device determines what other type of system, method, implementation, and so forth, the tolling agency uses to collect the toll, and then uses that respective approach. The process 500 may then continue to act 514, where the vehicle device facilitates payment of the toll, as will be discussed in greater detail below.

Returning to act 506, if the tolling agency uses a transponder system (506 YES), the process 500 continues to act 510. At act 510, the vehicle device determines whether it is presently emulating the correct transponder system, including both the type of system and any protocol used by the system. For example, if a tolling agency uses protocol A with a passive transponder system, the vehicle device may determine said protocol and passive type of transponder. Likewise, if a tolling agency uses protocol B with an active transponder system, the vehicle device may determine that said protocol and active type transponder are used. The vehicle device may determine the type of emulation required using any method. In some examples, the type of transponder and protocol of the transponder associated with the tolling agency may be recorded in a database that the vehicle device may reference. If the vehicle device determines that it is emulating the proper transponder system (510 YES), the process 500 may continue to act 514. If the vehicle device determines that it is not emulating the proper transponder system (510 NO), then the process 500 may continue to act 512.

At act 512, the vehicle device switches to emulate the proper transponder system and the process 500 may then continue to act 514. Emulating the proper transponder system may be accomplished using any available method, including by emulating the features of the transponder system and using the protocol associated with the transponder system. For example, the vehicle device may have an emulation circuit (or circuits) capable of emulating any type of available transponder (e.g., the controller 402 and transceiver 408 of FIG. 4, in some examples).

At act 512, the vehicle device pays the toll. The vehicle device may pay the toll by transmitting the appropriate information required by the tolling agency or by using any other method described herein. Paying the toll may include collecting and/or sending any relevant information required to verify a tolling level election, such as HOV election.

As mentioned above, aspects of this disclosure apply to related applications as well. For example, many modern parking systems operate similarly to toll system, with automated billing based on parking location and time. Accordingly, the vehicle device 102, 400 may be able to pay parking fees, parking tickets, apply good driver discounts where applicable, pay for drive-thru orders, and so forth.

The vehicle device 102, 400 is also capable of applying heuristics where appropriate. For example, the vehicle device 102, 400 may understand that certain hours during certain days correspond to certain tolling level elections. As an example, a given vehicle may transport a child to school between 8 am and 9 am Monday through Friday during the school year. The vehicle device 102, 400 may recognize such situations and automatically apply or request a prompt from the user to apply a given tolling level election. In some cases, a tolling level election may expire a set period of time after being made, in which case the vehicle device 102, 400 may prompt the user to (or automatically) renew the election.

As a result, the vehicle device 102, 400 provides heretofore nonexistent opportunities for convenience and provide a very verbose service offering.

In some examples, the vehicle device 102, 400 may also be paired with a "daughter device." For example, if the vehicle device 102, 400 is placed in a position where it has poor signal strength or otherwise cannot easily communicate, the daughter device may be placed somewhere where communication is easier, and may provide the improved communication to the vehicle device 102, 400 (e.g., the daughter device may be a relay, repeater, antenna extension, and so forth). Likewise, the daughter device may facilitate interfacing between the vehicle device 102, 400 and the vehicle (e.g., the daughter device may be an adapter of some sort).

To add to the modularity of the vehicle device 102, 400, rather than considering this hardware and a combination of optional applications, the device could be built as a modular hardware platform where applications are loaded as applications (e.g., from an app store), wherein the applications leverage the underlying hardware and network capabilities to carry out one or more of the functions described herein.

Examples of the methods and systems discussed herein are not limited in application to the details of construction and the arrangement of components set forth in the description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Various controllers, such as the controller 402, may execute various operations discussed above. Using data stored in associated memory and/or storage, the controller 402 also executes one or more instructions stored on one or more non-transitory computer-readable media, which the controller 402 may include and/or be coupled to, that may result in manipulated data. In some examples, the controller 402 may include one or more processors or other types of controllers. In one example, the controller 402 is or includes at least one processor. In another example, the controller 402 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A portable vehicle device for emulating a tolling system, comprising:
- a controller that is integral to the vehicle device and is configured to:
  - determine a first type of tolling system in use on a first toll route,
  - emulate or fail to emulate the first type of tolling system,
  - responsive to failing to emulate the first type of tolling system, transmit first tolling data to an intermediary collection service, the intermediary collection service being configured to provide the first tolling data to a tolling agency managing the first toll route
  - determine a second type of tolling system in use on a second toll route,
  - emulate or fail to emulate the second type of tolling system, and
  - responsive to failing to emulate the second type of tolling system, transmit second tolling data to an intermediary collection service, the intermediary collection service being configured to provide the second tolling data to a tolling agency managing the second toll route.

2. The vehicle device of claim 1 further comprising a transceiver, the transceiver being configurable to operate as one or both of a passive transponder and an active transponder.

3. The vehicle device of claim 1 further comprising a display, the display being configured to provide an indication of a change in a tolling level election.

4. The vehicle device of claim 1 further comprising a display and a user interface, the display being configured to provide an indication to select a tolling level election and the user interface configured to receive an election of a tolling level.

5. The vehicle device of claim 1, wherein the vehicle device is further configured to determine the first type of tolling system by acquiring location data and determining whether the vehicle is on a toll route based on the location data.

6. The vehicle device of claim 1, wherein the vehicle device is further configured to determine a number of miles traveled by the vehicle and to transmit a signal that enables payment of a toll based on the number of miles.

7. The vehicle device of claim 1, wherein the vehicle device is further configured to facilitate payment of at least one of a first toll corresponding to the first toll route or a second toll corresponding to the second toll route.

8. The vehicle device of claim 1, wherein the vehicle device is further configured to use at least one antenna to communicate using a first network connection, the first network connection communicatively linking the vehicle device to at least one of an intermediary collection service or a tolling agency.

9. The vehicle device of claim 8, wherein the vehicle device further includes at least one display, and one or more input/output ports.

10. A method of managing toll payment using a single vehicle device, the method comprising:

determining a first type of tolling system associated with a first toll route via the single vehicle device;

emulating or failing to emulate the first type of tolling system via the single vehicle device;

responsive to failing to emulate the first type of tolling system, transmitting, via the single vehicle device, first tolling data to an intermediary collection service, the intermediary collection service being configured to provide the first tolling data to a tolling agency managing the first toll route;

determining a second type of tolling system associated with a second toll route via the single vehicle device;

emulating or failing to emulate the second type of tolling system via the single vehicle device; and responsive to failing to emulate the second type of tolling system, transmitting, via the single vehicle device, second tolling data to an intermediary collection service, the intermediary collection service being configured to provide the second tolling data to a tolling agency managing the second toll route.

11. The method of claim 10, further comprising configuring a transceiver to operate as an active transponder responsive to determining that the first type of tolling system uses active transponders, or configuring the transceiver to operate as a passive transponder responsive to determining that the second type of tolling system uses passive transponders.

12. The method of claim 10 further comprising displaying an indication of a change in a tolling level election.

13. The method of claim 10 further comprising providing an indication to select a tolling level election and, responsive to receiving an input, electing a corresponding tolling level.

14. The method of claim 10 further wherein determining the first type of tolling system includes acquiring location data and determining the first toll route based on the location data, the location data corresponding to a location of a vehicle on the first toll route.

15. The method of claim 10 further comprising acquiring a number of miles traveled by a vehicle on the first toll route and transmitting a signal to facilitate payment of a toll based on the number of miles.

16. The method of claim 10 further comprising transmitting a signal to facilitate payment of at least one of a first toll corresponding to the first toll route or a second toll corresponding to the second toll route.

17. The method of claim 10 further comprising communication using a first network connection to transmit a signal to facilitate payment of a toll, the first network connection communicatively linking to at least one of an intermediary collection service or a tolling agency.

18. A non-transitory computer-readable medium containing thereon instructions for paying a toll, the instructions instructing one processor to:

determine a first type of tolling system associated with a first toll route;

emulate or fail to emulate the first type of tolling system;

responsive to failing to emulate the first type of tolling system, transmit first tolling data to an intermediary collection service, the intermediary collection service being configured to provide the first tolling data to a tolling agency managing the first toll route determine a second type of tolling system associated with a second toll route;

emulate or fail to emulate the second type of tolling system; and responsive to failing to emulate the second type of tolling system, transmit second tolling data to the intermediary collection service, the intermediary collection service being configured to provide the second tolling data to a tolling agency managing the second toll route.

19. The non-transitory computer-readable medium of claim 18 wherein the instructions further instruct the one processor to configure a transceiver to operate as an active transponder responsive to determining that the first type of tolling system uses active transponders, and to configure the transceiver to operate as a passive transponder responsive to determining that the first type of tolling system uses passive transponders.

20. The non-transitory computer-readable medium of claim 18 wherein the instructions further instruct the one processor to elect a tolling level for use in determining a toll on a toll route.

* * * * *